3,492,247
CATALYST AND METHOD OF PREPARING UNSATURATED ACIDS AND ALDEHYDES
Jamal S. Eden, Akron, Ohio, assignor to The B. F. Goodrich Company, New York, N.Y., a corporation of New York
No Drawing. Original application Aug. 30, 1965, Ser. No. 483,830, now Patent No. 3,401,197, dated Sept. 10, 1968. Divided and this application Dec. 4, 1967, Ser. No. 701,509
Int. Cl. B01j *11/82;* C07c *51/00, 45/02*
U.S. Cl. 252—437
5 Claims

ABSTRACT OF THE DISCLOSURE

Catalysts useful for vapor phase oxidation of propylene and isobutylene to form acrolein and acrylic acid or methacrolein and methacrylic acid contain molybdenum oxide, tellurium oxide and a metal phosphate of a metal of the fourth period of Group VIII of the Periodic Table in a molar ratio of 100 molybdenum oxide, 10–100 tellurium oxide and 10–100 metal phosphate.

---

This is a division of application Ser. No. 483,830, filed Aug. 30, 1965, now U.S. Patent No. 3,401,197.

This invention relates to new and useful catalysts and to a method of preparing unsaturated aldehydes and unsaturated carboxylic acids by oxidation of unsaturated hydrocarbons at an elevated temperature, and relates more particularly to catalysts comprising a mixture of a molybdenum oxide, tellurium oxide and a metal phosphate of a metal of the fourth period of Group VIII of the Periodic Table in a molar ratio of 100 $MoO_3$, 10–100 $TeO_2$, and 10–100 of the metal phosphate and to a method of preparing acrolein and acrylic acid or methacrolein and methacrylic acid by passing vapors of propylene or isobutylene and an oxygen containing gas over the catalyst at a temperature of from about 325° C. to about 550° C. The catalyst can also be designated as $$Mo_{10}To_{1-10}M_{2-20}P_{2-20}O_{39-120}$$

wherein M is a metal of the fourth period of Group VIII, iron, nickel and cobalt, with the P being in the form of a phosphate i.e., each P is attached to 3 or 4 oxygen atoms.

Numerous attempts have been made in the past to prepare products of higher oxidation state from hydrocarbons, especially from the normally gaseous hydrocarbons. However, all prior catalysts and procedures for oxidizing monolefinic gaseous hydrocarbons to monoolefinically unsaturated aldehydes or monoolefinically unsaturated carboxylic acids with the same number of carbon atoms as the hydrocarbon having serious shortcomings. The catalysts either have a very short active life, or they convert only a portion of the hydrocarbon to desired end groups per pass; they oxidize the hydrocarbon excessively to form high proportions of carbon monoxide or carbon dioxide or both; they are not sufficiently selective, so that the hydrocarbon molecule is attacked at both the olefinic unsaturation and at a methyl group; or the oxidation of the olefin does not proceed beyond the aldehyde stage.

It is therefore unexpected to find a catalyst having unusually long life that will convert a substantial amount, more than 50% per pass, of a gaseous monolefin such as propylene or isobutylene to yield very high proportions of acrolein and acrylic acid or methacrolein and methacrylic acid. It is also unexpected to find a catalyst that produces a wide range of ratios of olefinic aldehyde to monoolefinically unsaturated carboxylic acid by controllable changes in reaction conditions or catalyst composition. Mol percent efficiencies of about 8 to 60 for the aldehyde and about 16 to 45 for the unsaturated carboxylic acid have been obtained with the catalyst and process of this invention. Usually when the efficiency for conversion of the hydrocarbon to aldehyde is high the efficiency for the conversion to acid is low and vice versa. This provides a great degree of flexibility in the process, so as to provide means for obtaining a product mix that is needed at any particular time during commercial operation:

THE REACTANTS

The essential reactants are (1) propylene or isobutylene and (2) an oxygen containing gas, which can be pure oxygen, oxygen diluted with an inert gas, oxygen enriched air or air without additional oxygen. For reasons of economy, air is the preferred oxygen containing reactant.

For the purpose of this invention the hydrocarbons which are oxidized can be defined generically by the formula

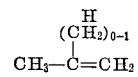

wherein it is also apparent that the end products formed result from the oxidation of only one methyl group on the hydrocarbon molecule while the terminal

remains intact.

Stoichiometric ratios of oxygen to olefin for the purpose of this invention are 1.5 to 1. Slightly lower amounts of oxygen can be used at a sacrifice of yield. It is preferred, however, to use 33 to 66% excess oxygen. Larger excessess do not impair the yields of aldehydes and acids, but for practical considerations an excess much above 100% would require extremely large equipment for a given production capacity.

The addition of steam into the reactor along with the hydrocarbon and oxygen containing gas is desirable but not absolutely essential. The function of steam is not clear, but it seems to reduce the amount of carbon monoxide and dioxide in the effluent gases.

Other diluent gases can be used. Surprisingly, saturated hydrocarbons such as propane are rather inert under the reaction conditions. Nitrogen or other known inert gases can be used as diluents if desired.

THE CATALYST AND ITS PREPARATION

There are several methods for the preparation of the catalyst, which can be supported or unsupported. It is possible to dissolve each of the starting ingredients in water and combine them from the aqueous solutions or the ingredients can be dry blended. Because of the more uniform blend obtained by the solution procedure, it is preferred.

The general procedure for preparing a catalyst from water soluble ingredients is to dissolve the requisite amount of a molybdenum salt, a tellurium salt and the Group VIII metal salt in water. Add the requisite amount of phosphoric acid to the Group VIII metal salt solution. Add the tellurium salt solution to the molybdenum salt solution and then add the Group VIII metal salt-phosphoric acid mixture to the molybdenum-tellurium salt mixture. The catalyst is then dried and baked at 400° C. for about 16 hours.

Supported catalysts can be prepared by adding a dry support or an aqueous slurry thereof to the aqueous solution of catalyst or the aqueous catalyst ingredients can be added to the slurry of the support.

Alternatively, a slurry of the catalyst ingredients can be prepared in water, then dried and baked. For supported catalysts the aqueous slurry of the catalyst ingredients can be added to an aqueous suspension of the support or vice versa, and then dried and baked.

Another method is to blend the dry ingredients of the desired particle size and then mix them thoroughly. Thorough blending and uniform particle size is desired.

A specific example of the solution method is now set forth.

In this procedure the ingredients are precipitated on blending.

(a) Dissolve 105.96 g. of ammonium molybdate ($4H_2O$) in 130 ml. distilled water at about 50° C.

(b) Dissolve 31.922 g. $TeO_2$ in 80 ml. concentrated HCl and filter if necessary.

Add the tellurium salt solution to the ammonium molybdate solution. A precipitate forms.

(c) Dissolve 54.06 g. $FeCl_3 \cdot 6H_2O$ in water and add 23.1 g. of 85% $H_3PO_4$. Add this mixture slowly to the precipitated ammonium molybdate-$TeO_2$ mixture.

Dry on a steam bath and bake for 16 hours at 400° C. Thereafter, the catalyst is ground to the desired mesh size and sieved. For supported catalysts an aqueous slurry of the support can be added to the catalyst ingredients, or vice versa, prior to drying and baking.

A supported catalyst may be prepared by adding to (c) 240 grams of an aqueous colloidal dispersion of microspheroidal silica in a concentration of 30–35% $SiO_2$ (Ludox H.S.). The silica may also be added to one of the individual ingredients or (c) to the silica dispersion.

Among the suitable supports are silica, silica containing materials, such as diatomaceous earth, kieselguhr, silicon carbide, clay, aluminum oxides and even carbon, although the latter tends to be consumed during the reaction.

The exact chemical structure of the catalysts made by the above procedures is not known, but catalysts with molar ratios of 100 mo. 10–100 Te and 10–100 of a Group VIII metal phosphate can be used for oxidizing the mono-olefinic hydrocarbon to aldehyde and/or carboxylic acid. The catalyst contains chemically bound oxygen so that the generic formula can be written as $MoO_3$ $_{100}TeO_2$ $_{10-100}M_2P_2O_7$ or other Group VIII metal phosphate 10–100. The phosphate can be a $PO_4$ radical, a pyrophosphate, or a polyphosphate, for example, ferrous phosphate, ferric phosphate, ferric pyrophosphate, nickel orthophosphate, nickel pyrophosphate, cobalt phosphate and the like.

Useful catalysts are ones having ratios of $100MoO_3$, 33.33 $TeO_2$, and 66.66 $Co_2P_2O_7$; 100 $MoO_3$, 33.33 $TeO_2$, and 66.66 $Ni_2P_2O_7$; 100 $MoO_3$, 33.33 $TeO_2$, and 33.33 $FePO_4$; and 100 $MoO_3$, 33.33 $TeO_2$, and 66.66 $Fe_4(P_2O_7)_3$ because they give high yields of desired products, and the preferred support is silica, because of its low cost and good fluidizing characteristics.

REACTION CONDITIONS

The reaction can be carried out in either a fixed or fluidized catalyst bed.

The reaction temperature can range from about 300 to 525° C. for the oxidation of propylene but the preferred range is from about 350 to about 500° C. Below 350° C. the conversion per pass is lower and low temperature tends to produce more aldehyde than desired. Usually, a longer contact time is needed at lower temperatures to obtain the yields of desired products obtainable at higher temperatures. Above 500° C. in the propylene oxidation some of the desired end products appear to be oxidized to carbon oxides. For isobutylene, oxidation temperatures of 375–550 are desirable with the preferred range being 300–450° C.

The molar ratio of oxygen to propylene or isobutylene should be at least 2 to 1 for good conversion and yields. Some excess oxygen, 33 to 66 mol percent is even more desirable and is preferred. There is no critical upper limit as to the amount of oxygen, but when air is used as the oxygen containing gas it becomes apparent that too great an excess will require large reactors, pumping, compressing and other auxiliary equipment for any given amount of desired end product. It is therefore best to limit the amount of air to provide a 33 to 66% excess of oxygen. This range provides the largest proportion of acid, under given reaction conditions. Also, since care is needed to avoid an explosive mixture, the limiting of air aids in that direction.

The molar ratio of steam to propylene or isobutylene can range from 0 to about 5 to 7, but best results are obtained with molar ratios of about 3 to 5 per mol of olefin and for this reason are preferred.

The contact time can vary considerably in the range of about 2 to 70 seconds. Best results are obtained in a range of about 8 to 54 seconds and this range is preferred. Longer contact times usually favor the production of acid at any given temperature.

The particle size of catalyst for fixed bed operations used is from 10–18 mesh. As is known, for fixed beds, the size may be of a wider range particle size. For fluid bed systems the catalyst size should be from 80–325 mesh (U.S. sieve).

The reaction can be run at atmospheric pressure, in a partial vacuum or under induced pressure up to 50–100 p.s.i. Atmospheric pressure is preferred for fixed bed systems and a pressure of 1 to 100 p.s.i. for fluid bed reactions. Operation at a pressure which is below the dew point of the unsaturated acid at the reaction temperature is advantageous.

The data in the examples show that wide variations in percentages of unsaturated acids and aldehydes can be obtained with a single catalyst, using fixed ratio of reactants but changing the temperature and/or contact time. Further variation is obtainable by controlling the other variables in the reaction including the catalyst compositions within the limits set forth herein.

The examples are intended to illustrate the invention but not to limit it.

THE EXAMPLES

A series of runs was made in a fixed bed reactor of a high silica (Vycor) glass tube 12 inches long and 30 mm. outer diameter. The reactor had three inlets, one for air, one for steam and one for propylene. Three external electrically operated heating coils were wound on the reactor. One of the coils extended along the entire length of the reactor and each of the remaining coils extended only about one-half the length of the reactor.

Outlet vapors were passed through a short water cooled condenser. Uncondensed gases were passed through a gas chromatograph (Perkin-Elmer Model 154D) and analyzed continuously. The liquid condensate was weighed and then analyzed for acrylic acid and acrolein in the gas chromatograph.

Example 1

The reactor was filled to about 90% of its capacity with 170 ml. of a catalyst made by the solution method described above, with $FeCl_3$, using a ratio of 75 $MoO_3$, 25 $TeO_2$ and 25 $FePO_4$. Empirically, the catalyst is $Mo_{100}Te_{33.33}Fe_{33.33}P_{33.33}O_{500}$ and the P is present as $PO_4$. The catalyst was not supported and had a mesh size of 10–18 (U.S. sieve).

Steam at a temperature of 200–250° C. was first passed into the reactor. Then propylene and air were separately fed into the stream of water vapor. This mixture then passed through a preheater and entered the reactor at about 200–250° C. The reactor was preheated to about 285° C. before the gas feed was begun. The ratio of reactants was about 2.955 mols of oxygen and 4.36 mols of steam per mol of propylene. Cold contact time is as set forth in the table below. The reaction temperature was varied as the reaction proceeded.

The table below summarizes the data obtained in these runs:

| Run No. | Temp., °C. | Contact Time, seconds | Mol percent Propylene Converted | Mol percent Yield On Propylene Conv. | | Mol percent Efficiency | |
|---|---|---|---|---|---|---|---|
| | | | | Acr. | AA | Acr. | AA |
| 1 | 372 | 29 | 99.28 | 46.74 | 34.95 | 46.4 | 34.7 |
| 2 | 405 | 32 | 100 | 30.61 | 37.24 | 30.61 | 37.24 |

Acr.=Acrolein.  AA=Acrylic acid.

Example 2

For a second series a pyrophosphate catalyst was made as described, with 108 g. Fe $Cl_3 \cdot 6H_2O$ and 69.2 g. of phosphoric acid.

The reactor was filled to about 90% of its capacity with 170 ml. of this catalyst made by the solution method described above, using a ratio of 75 $MoO_3$, 25 $TeO_2$ and 12.5 $Fe_4(P_2O_7)_3$. Empirically the catalyst is $$Mo_{100}Te_{33.3}Fe_{66.6}P_{100}O_{716.66}$$

and the P is present as $P_2O_7^{-4}$. The catalyst was not supported and had a mesh size of 10–18 (U.S. sieve).

Steam at a temperature of 200–250° C. was first passed into the reactor. Then propylene and air was separately fed into the stream of water vapor. This mixture then passed through a preheater and entered the reactor at about 200–250° C. The reactor was preheated to about 285° C. before the gas feed was begun. The ratio of reactants was about 2.955 mols of oxygen and 4.36 mols of steam per mol of propylene. Cold contact time was 45 seconds. The reaction temperature was varied as the reaction proceeded.

The table below summarizes the data obtained in these runs:

| Run No. | Temp., °C. | Mol percent Propylene Converted | Mol percent Yield on propylene Converted | | Mol percent Efficiency | |
|---|---|---|---|---|---|---|
| | | | Acr. | AA | Acr. | AA |
| 1 | 360 | 88.77 | 60.36 | 16.63 | 53.58 | 14.76 |
| 2 | 380 | 98.16 | 37.96 | 31.48 | 37.27 | 30.91 |
| 3 | 405 | 100 | 14.27 | 39.51 | 14.27 | 39.51 |

Acr.=Acrolein.  AA=Acrylic acid.

Example 3

A nickel catalyst was made as follows:

(a) Dissolve 105.96 g. of ammonium molybdate ($4H_2O$) in 130 ml. distilled water.

(b) Dissolve 31.922 g. $TeO_2$ in 80 ml. concentrated HCl and filter if necessary.

Add the tellurium salt solution to the ammonium molybdate solution. A precipitate forms.

(c) Disoslve 95.08 g. $NiCl_2 \cdot 6H_2O$ in 110 ml. of water and add 46.2 g. of 85% $H_3PO_4$. Add this mixture slowly to the precipitated ammonium molybdate-$TeO_2$ mixture.

Dry on a steam bath and bake for 16 hours at 400° C. Thereafter, the catalyst is ground to the desired mesh size and sieved. For supported catalysts an aqueous slurry of the support can be added to the catalyst ingredients, or vice versa, prior to drying and baking.

The reactor was filled to about 90% of its capacity with 170 ml. of this catalyst made by the solution method described above, having a ratio of 75 $MoO_3$, 25 $TeO_2$ and 25 $Ni_2P_2O_7$. Empirically the catalyst is $$Mo_{100}Te_{33.33}Ni_{66.6}P_{66.6}O_{600}$$

and the P is present as $P_2O_7^{-4}$. The catalyst was not supported and had a mesh size of 10–18 (U.S. sieve). Steam at a temperature of 200–250° C. was first passed into the reactor. Then propylene and air were separately fed into the stream of water vapor. This mixture then passed through a pre-heater and entered the reactor at about 200–250° C. The reactor was pre-heated to about 285° C. before the gas feed was begun. The ratio of reactants was about 2.955 mols of oxygen and 4.36 mols of steam per mol of propylene. Cold contact time was 20 seconds. The reaction temperature was 410° C. Acrolein and acrylic acid were obtained as a mol percent efficiency of 40.41 and 30.82.

Example 4

A cobalt catalyst was made in the same manner as in Example 3 and with the same weight reactants, 95.2 g. $CoCl_2 \cdot 6H_2O$. The reactor was filled to about 90% of its capacity with 170 ml. of this catalyst made by the solution method described above, using a ratio of 75 $MoO_3$, 25 $TeO_2$ and 25 $Co_2P_2O_7$. Empirically the catalyst is $Ho_{100}Te_{33.33}Co_{66.6}P_{66.6}O_{600}$ and the Pis present as $P_2O_7$ The catalyst was not supported and had a mesh size of 10–18 (U.S. sieve). Steam at a temperature of 200–250° C. was first passed into the reactor. Then propylene and air were separately fed into the stream of water vapor. This mixture then passed through a preheater and entered the reactor at about 200–250° C. The reactor was pre-heated to about 285° C. before the gas feed was begun. The ratio of reactants was about 2.955 mols of oxygen and 4.36 mols of steam per mol of propylene. Cold contact time was 45 seconds. The reaction temperature was varied as the reaction proceeded.

The table below summarizes the data obtained in these runs:

| Run No. | Temp., °C. | Mol percent Efficiency | |
|---|---|---|---|
| | | Acr. | AA |
| 1 | 425 | 34.97 | 20.32 |
| 2 | 480 | 8.27 | 45.56 |

Acr.=Acrolein.  AA=Acrylic acid.

I claim:

1. A catalyst composition consisting essentially of molybdenum oxide, tellurium oxide and a metal phosphate of a metal of the fourth period of Group VIII of the Periodic Table in a molar ratio of 100 molybdenum oxide, 10–100 tellurium oxide and 10–100 of the metal phosphate.

2. A catalyst composition of claim 1 wherein the metal phosphate is $CoP_2O_7$ with $MoO_3$ and $TeO_2$.

3. A catalyst composition of claim 1 wherein the metal phosphate is $Ni_2P_2O_7$ with $MoO_3$ and $TeO_2$.

4. A catalyst composition of claim 1 wherein the metal phosphate is $FePO_4$ with $MoO_3$ and $TeO_2$.

5. A catalyst composition of claim 1 wherein the metal phosphate is $Fe_4(P_2O_7)_3$ with $MoO_3$ and $TeO_2$.

References Cited

UNITED STATES PATENTS

| | | | |
|---|---|---|---|
| 3,192,259 | 6/1965 | Fetterly et al. | 252—437 XR |
| 3,352,905 | 11/1967 | Kerr | 252—437 XR |
| 3,392,189 | 7/1968 | Eden | 252—437 XR |

PATRICK P. GARVIN, Primary Examiner

U.S. Cl. X.R.

260—533, 604

PO-1050
(5/69)

UNITED STATES PATENT OFFICE
CERTIFICATE OF CORRECTION

Patent No. 3,492,247      Dated January 27, 1970

Inventor(s) Jamal S. Eden

It is certified that error appears in the above-identified patent and that said Letters Patent are hereby corrected as shown below:

Column 1, line 42, that portion of the formula reading "$Mo_{10}To_{1-10}$" should read ---$Mo_{10}Te_{1-10}$---.

Column 5, line 53, "Disoslve" should read ---Dissolve---.

Column 6, line 20, that portion of the formula reading "$HO_{100}Te_{33.33}$" should read ---$Mo_{100}Te_{33.33}$---; line 20, "Pis" should read ---P is---.

SIGNED AND
SEALED
JUN 3 0 1970

(SEAL)
Attest:

Edward M. Fletcher, Jr.
Attesting Officer

WILLIAM E. SCHUYLER, JR.
Commissioner of Patents